Oct. 22, 1929.  W. T. CRAIG  1,732,355
COUPLING
Filed Aug. 19, 1926   2 Sheets-Sheet 1
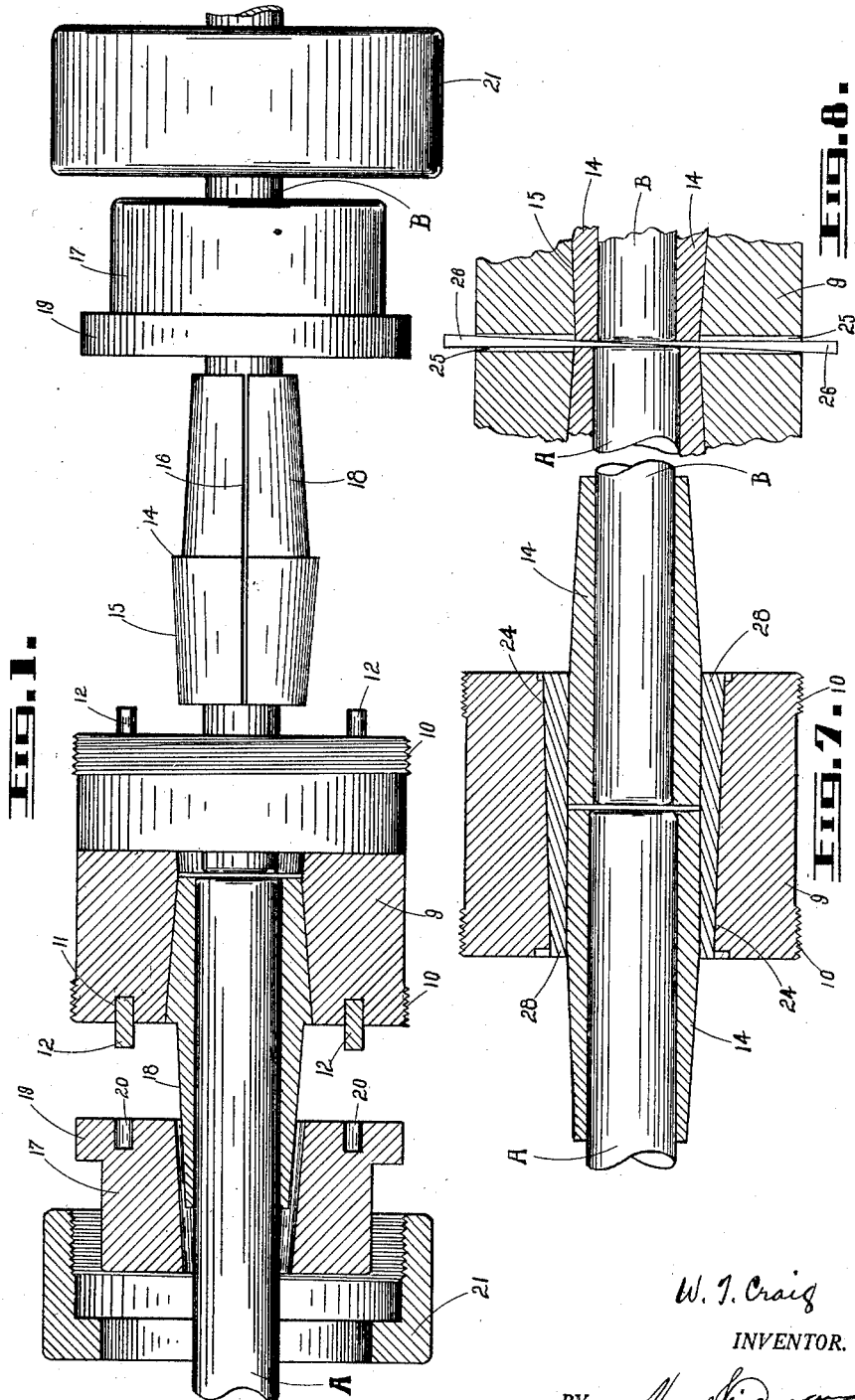
W. T. Craig
INVENTOR.
BY
ATTORNEY.

Oct. 22, 1929.  W. T. CRAIG  1,732,355
COUPLING
Filed Aug. 19, 1926   2 Sheets-Sheet 2
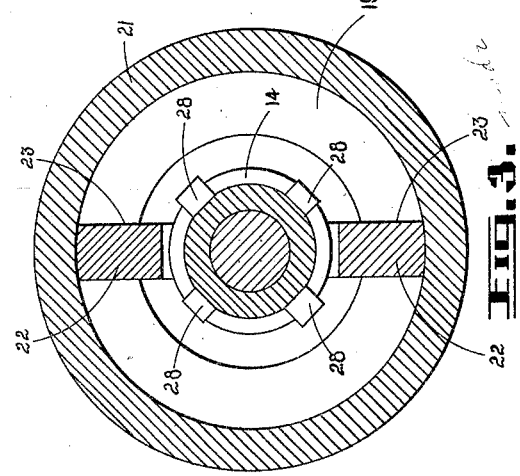
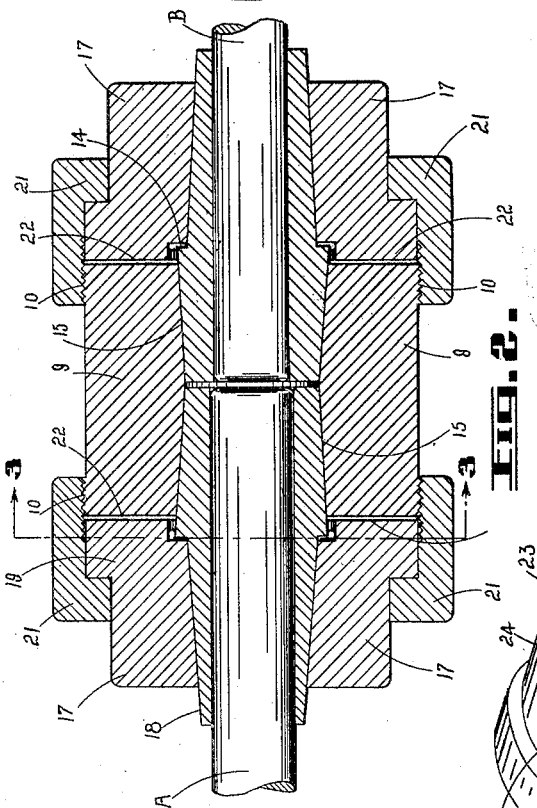
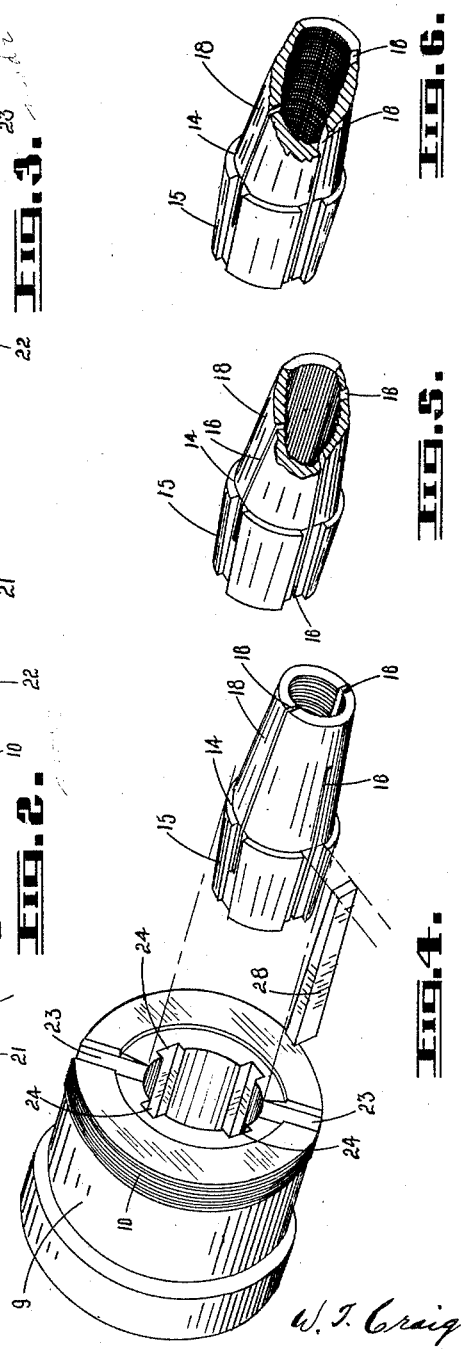
W. T. Craig
INVENTOR.
BY Harold C. Shipman
ATTORNEY.

Patented Oct. 22, 1929

1,732,355

UNITED STATES PATENT OFFICE

WILLIAM TALBOT CRAIG, OF GOWGANDA, ONTARIO, CANADA

COUPLING

Application filed August 19, 1926. Serial No. 130,293.

This invention relates to apparatus used in connection with shafting and particularly to the coupling of different pieces of shafting together to make a continuous operating unit or the coupling of a hub of a wheel on a shaft.

The principal object is to provide a coupling for shafting wherein the parts of the coupling are so devised and assembled as to give a strong and rigid connection.

A further object is to provide a coupling for shafting wherein a compound pressure is exerted in forming a tight union between the meeting ends of the pieces of shafting.

A further object is to provide a coupling for shafting wherein the different parts are co-operatively locked together in such a manner that they will be easily assembled and when desired they will be easily disconnected.

A further object is to provide a coupling for shafting wherein the break between the uniting parts will be offset from the break between the ends of the shaft being coupled together.

A further object is to provide a coupling for shafting which will easily adapt itself, without much variation, to coupling shafts of different diameters.

Other objects and advantages of my invention will become apparent ensuing a perusal of the following specification read in conjunction with the annexed drawings, in which:

Fig. 1 shows a general view of my invention, that part on the right hand side being in a side elevation ready for assembling and that part on the left hand side being a sectional illustration ready for assembling.

Fig. 2 is a longitudinal section view showing the modified form of my invention.

Fig. 3 is a transverse sectional view taken on the line 3—3 of Fig. 2.

Fig. 4 is a perspective view of one end of the hub, one of the sleeves and one of the keys.

Fig. 5 is a perspective view of a modified form of one of the sleeves, part being broken away.

Fig. 6 is a further modified form of one of the sleeves, part being broken away.

Fig. 7 is a longitudinal sectional view showing particularly the position of the keys relative to the hub and the sleeves.

Fig. 8 is a longitudinal sectional view showing one preferred method of disengaging the sleeves from their normal fixed position in the hub.

Like numerals of reference designate corresponding parts throughout the different views.

A represents the end of a shaft and B represents the end of another shaft which are to be coupled together.

9 indicates a hub having the opposite ends of its periphery threaded as at 10. Openings 11 are drilled at spaced distances apart into the opposite ends of the hub. Dowels 12 are fitted tightly into these openings 11 so as to be normally retained therein. An opening extends centrally through the hub. This opening tapers inwardly from the opposite ends equal distances, as clearly illustrated in Figs. 1 and 2, the purpose of which will hereinafter be stated.

14 indicates sleeves in the form of two frusto-conical shaped portions, the larger ends of which are integral. The tapering on the larger end, as at 15, is such as to provide engagement in one-half of the tapered central opening in the hub 9, so that when it is in normal engaged position, the tapering on the central opening will cause this end of the sleeve to bind on the shaft to which it is fitted.

16 is a longitudinal slot cut in one side of the sleeve 14, so as to provide for compression of this sleeve when the different parts of the coupling are fitted together to bind the sleeve onto the shaft.

17 illustrates the removable portions of the hub having a central tapered opening of such size as to co-operate with the tapered end portion 18 of the sleeve 14 and when fitted together to cause compression of this portion against the shaft. 19 is an annular flange formed outwardly on the inner end of the removable portions 17. Openings 20 are drilled in the inner face of the removable portions 17 and are positioned so as to register opposite the extended dowels 12. When in position, dowels 12 retain the removable portions 17 in fixed relation to the hub 9 and will not permit the removable portion 17 to rotate.

21 indicates caps provided with a central opening adapted to fit over the body portion of the removable portions 17. These caps have an inwardly directed circumferential flange partially threaded and adapted to threadedly engage the threaded portion 10 of the hub 9.

In assembling a coupling of this nature, the shafts A and B are positioned in alignment as closely as possible after a cap 21, a removable portion 17 and a sleeve 14 have been positioned on the respective ends of the shafts, as illustrated in Fig. 1. The hub will be slid onto either shaft end. The hub is now positioned so that the longitudinal center of the central opening is in alignment with the meeting ends of the shaft ends. The sleeves 15 are now slid along their respective shaft ends and forced into tight engagement between their tapered portion 15 of the respective tapered portions of the central opening in said hub. The removable portions 17 are now slid along their respective shaft ends and so turned that the openings 20 will register opposite the protruding ends of the dowels 12. The caps 21 are then slid along their respective shaft ends and threadedly engaged on the threaded ends 10 of the hub 9. The caps are now turned as tightly as possible and when in their desired normal operating position, they will cause the removable portions 17 to slide along the tapered portion 18 of the sleeve 14 to cause a binding of the sleeve 14 to the shaft.

From the above explanation of my construction, it will be noted that the hub portion 9 extends on each side of the break between the connected ends of the shafts. It will be further noted that the respective sleeves extend on opposite sides between the break in the body portion and the removable end portions of the hub. Thus, I provide a coupling wherein the various parts coupled together have their joint offset from the ends of the connected ends of the shaft and therefore I provide a construction which will keep the opposite portions of shafting in rigid alignment and embody strength for driving force.

In making the sleeves 14, the central longitudinal opening may be made of many different standard sizes without varying the outer size of the sleeve and therefore easily standardize the sizes for the couplings.

In the construction so far described, I have provided for what might be termed as a coupling for light or medium shafting. Where heavy shafting is to be coupled together, a stronger fitting of parts may be desired. In couplings designed for such purposes, I eliminate the dowels 12 and substitute therefor radial ribs 22 integral with the inner face of the removable portions 17 and adapted to be fitted into radially cut slots 23 on the opposite ends of the hub 9. Referring to Fig. 4, it will be noted that I illustrate two of these slots 23 oppositely positioned. I do not wish to limit myself to the use of only two of these as it might be found necessary to provide for four or more. By having these slots in opposite alignment to each other, they can be machined out at a very reasonable cost. The central longitudinal opening of the hub 9 is provided with spaced longitudinal slots 24, each alternate slot being preferably tapered from the opposite end. In referring to Fig. 7, it will be noted that these tapered slots extend from end to end of the hub 9 irrespective of the tapered faces of the central opening of the hub. The sleeves used in combination with this hub have their ends 15 slotted to register in alignment and co-operate with the slots 24. Keys 28 are driven into these slots formed between the sleeves and the hub. By having these keys driven into position before the removable portions 17 are positioned against the ends of the hub 9, there is a greater exertion of compression of the sleeves on the shaft and at the same time the keys retain the hub in fixed relation to the sleeves. The keys 28 interlock the sleeves in fixed relation relative to each other as well as to said hub. From the illustration, it will be noted that these sleeves are slotted approximately ⅔ their longitudinal length and alternately from opposite ends. Referring to Figs. 4, 5 and 6, it will be noted that the inner face of the sleeve in Fig. 4 is provided with annular grooves. In Fig. 5, the inner face of the sleeve is provided with longitudinal grooves. In Fig. 6, the inner face of the sleeve is provided with both annular and longitudinal grooves. Any desired arrangement for providing a gripping surface for the inner face of these sleeves may be adopted for causing a more tightly gripping effect between the inner face of the sleeves and the shaft.

Referring to Fig. 8, I have shown a broken away sectional view of the hub 9, sleeves 14 and shafts A and B. In this view, it will be noted that the hub is provided with oppositely registering openings 25 through which tapered wedges 26 are inserted. The inner ends of these wedges are lapped against each other to give an approximate flat wedging effect against the ends of the respective shafts and the sleeves 14. When the wedges 26 are put into position, they are tapped on the outer ends at the same time and the sudden jar will release the tight fit of the sleeves 14 in the central opening of the hub.

This construction as hereinbefore described may be used as a hub of a wheel to be mounted on a shaft. The spokes will be connected to or made integral with the hub 9 and the spokes will be provided with any desired kind of a rim for the purpose for which the construction is to be used.

Minor changes may be resorted to in the commercial adaptation of my invention, but:

What I claim as new is:

1. In a coupling for shafts, a hub threaded at its ends and having a central opening tapered inwardly from its opposite ends; slotted sleeves having tapered inner ends adapted to co-operate with the respective tapered faces of said central opening; the outer ends of said sleeves being tapered in an opposite direction; removable portions, each provided with a central tapered opening adapted to fit the outer end of its respective sleeve; an annular shoulder on the inner end of each of said removable portions; and a screw cap engageable against said shoulder and adapted to threadedly engage said hub for drawing its respective removable portion towards said hub.

2. In a coupling for shafts, a hub threaded at its ends and having a central opening tapered inwardly from its opposite ends; slotted sleeves having tapered inner ends adapted to co-operate with the respective tapered faces of said central opening; the outer ends of said sleeves being tapered in an opposite direction; removable portions, each provided with a central tapered opening adapted to fit the outer end of its respective sleeve; an annular shoulder on the inner end of each of said removable portions; means for locking said removable portions against rotation relative to said hub and a screw cap engageable against said shoulder and adapted to threadedly engage said hub for drawing its respective removable portion towards said hub.

3. In a coupling for shafts, a hub having a central opening tapered inwardly from its opposite ends; slotted sleeves having tapered inner ends adapted to co-operate with the respective tapered faces of said central opening; the outer ends of said sleeves being tapered in an opposite direction; removable portions, each provided with a central tapered opening adapted to fit the outer end of its respective sleeve; means for locking said sleeves against rotation relative to said hub and means for drawing said removable portions towards said hub.

4. In a coupling for shafts, a hub having a central opening tapered inwardly from its opposite ends; slotted sleeves having tapered inner ends adapted to co-operate with the respective tapered faces of said central opening; the outer ends of said sleeves being tapered in an opposite direction; removable portions, each provided with a central tapered opening adapted to fit the outer end of its respective sleeve; means for locking said removable portions against rotation relative to said hub; means for locking said sleeves against rotation relative to said hub and means for drawing said removable portions towards said hub.

5. A coupling for shafts comprising a three-piece hub, comprising a body portion and removable end portions, each removable end portion being fixed against rotation relative to the body portion and provided with an annular flange at its inner end; a slotted tapered sleeve between each of said removable portions and said body portion to independently engage its respective shaft end by compression, and an independent flanged coupling nut engageable with its respective flange for drawing each of said respective removable portions towards said body portion so as to cause independent compression to its respective sleeve.

6. In a coupling for shafts, a hub having a central opening tapered inwardly from its opposite ends; slotted sleeves having tapered inner ends adapted to co-operate with the respective tapered faces of said central opening; the outer ends of said sleeves being tapered in an opposite direction; removable portions, each provided with a central tapered opening adapted to fit the outer end of its respective sleeve; means for locking said removable portions against rotation relative to said hub; means for locking said sleeves against rotation relative to said hub and to each other; and means for drawing said removable portions towards said hub.

7. In a coupling for shafts, a three-piece hub having a center portion and end portions, the end portions being interlocked against independent rotation with the center portion; said center portion being threaded at its ends, a slotted tapered sleeve between each of said end portions and said center portion; and a screw cap rotatably engaging each of said end portions and threadedly engaging said center portion for drawing its respective end portion towards said center portion.

8. In a coupling for shafts, a three-piece hub having a center portion and end portions, the end portions being interlocked against independent rotation with the center portion; said center portion being threaded at its ends, a slotted tapered sleeve between each of said end portions and said center portion; a screw cap rotatably engaging each of said end portions and threadedly engaging said center portion for drawing its respective end portion towards said center portion; said center portion having an opening to permit access for wedging said sleeves and shafts apart when desired.

In testimony whereof, I affix my signature.

WILLIAM TALBOT CRAIG.